(12) United States Patent
Benjamin et al.

(10) Patent No.: US 11,823,110 B2
(45) Date of Patent: Nov. 21, 2023

(54) OPTIMIZING BUILDING DESIGN FOR FUTURE TRANSFORMATION AND EXPANSION

(71) Applicant: AUTODESK, INC., San Francisco, CA (US)

(72) Inventors: David Benjamin, Brooklyn, NY (US); Damon Lau, New York, NY (US); James Stoddart, Atlanta, GA (US); Lorenzo Villaggi, Brooklyn, NY (US); Rui Wang, New York, NY (US); Lindsey Wikstrom, West New York, NJ (US)

(73) Assignee: AUTODESK, INC., San Francisco, CA (US)

( * ) Notice: Subject to any disclaimer, the term of this patent is extended or adjusted under 35 U.S.C. 154(b) by 73 days.

(21) Appl. No.: 17/098,287

(22) Filed: Nov. 13, 2020

(65) Prior Publication Data

US 2021/0150090 A1    May 20, 2021

Related U.S. Application Data

(60) Provisional application No. 62/937,190, filed on Nov. 18, 2019.

(51) Int. Cl.
*G06Q 10/06* (2023.01)
*G06Q 10/0639* (2023.01)
(Continued)

(52) U.S. Cl.
CPC ... *G06Q 10/06393* (2013.01); *G06F 16/9024* (2019.01); *G06F 30/13* (2020.01);
(Continued)

(58) Field of Classification Search
CPC .......... G06Q 10/06393; G06Q 10/047; G06Q 10/0633; G06Q 10/06375;
(Continued)

(56) References Cited

U.S. PATENT DOCUMENTS 3,005,656 A1    8/2011 Ankory et al.
8,229,176 B2    7/2012 Seegers et al.
(Continued)

FOREIGN PATENT DOCUMENTS

KR    2015-0125457 A    11/2015

OTHER PUBLICATIONS

Osman, Hesham M., Maged E. Georgy, and Moheeb E. Ibrahim. "A hybrid CAD-based construction site layout planning system using genetic algorithms." Automation in construction 12.6 (2003): 749-764. (Year: 2003).*

(Continued)

*Primary Examiner* — Brian S Cook
(74) *Attorney, Agent, or Firm* — Artegis Law Group, LLP

(57) ABSTRACT

Various embodiments set forth systems and techniques for determining expandability of a budding design. The techniques include receiving a building geometry indicating a size of a building and a shape of the building; receiving building placement data indicating a placement of the building within a site; identifying one or more remaining spaces within the site based at least on the size of the building, the shape of the building, and the placement of the building within the site; for each remaining space of the one or more remaining spaces: determining whether the remaining space is a usable space; based on the determining whether the remaining space is a usable space, generating a space expansion value corresponding to the remaining space; and computing, based on space expansion values corresponding to the one or more remaining spaces, one or more aggregate (Continued)

expansion values associated with the building geometry and the building placement.

20 Claims, 6 Drawing Sheets

(51) Int. Cl.

| | | |
|---|---|---|
| *G06Q 10/0633* | (2023.01) | |
| *G06Q 10/047* | (2023.01) | |
| *G06F 30/13* | (2020.01) | |
| *G06Q 10/101* | (2023.01) | |
| *G06F 16/901* | (2019.01) | |
| *G06Q 50/16* | (2012.01) | |
| *G06F 30/20* | (2020.01) | |
| *G06F 30/28* | (2020.01) | |
| *G06Q 10/0637* | (2023.01) | |
| *G06Q 10/067* | (2023.01) | |
| *G06F 30/18* | (2020.01) | |
| *G06Q 50/08* | (2012.01) | |
| *G06T 17/20* | (2006.01) | |
| *G06F 111/04* | (2020.01) | |
| *G06F 111/02* | (2020.01) | |
| *G06F 111/10* | (2020.01) | |
| *G06F 119/02* | (2020.01) | |

(52) U.S. Cl.
CPC ............. *G06F 30/18* (2020.01); *G06F 30/20* (2020.01); *G06F 30/28* (2020.01); *G06Q 10/047* (2013.01); *G06Q 10/067* (2013.01); *G06Q 10/0633* (2013.01); *G06Q 10/06375* (2013.01); *G06Q 10/06395* (2013.01); *G06Q 10/101* (2013.01); *G06Q 50/08* (2013.01); *G06Q 50/163* (2013.01); *G06Q 50/165* (2013.01); *G06F 2111/02* (2020.01); *G06F 2111/04* (2020.01); *G06F 2111/10* (2020.01); *G06F 2119/02* (2020.01); *G06T 17/20* (2013.01)

(58) Field of Classification Search
CPC ........... G06Q 10/06395; G06Q 10/067; G06Q 10/101; G06Q 50/163; G06Q 50/165; G06Q 50/08; G06F 16/9024; G06F 30/13; G06F 30/20; G06F 30/28; G06F 2111/02; G06F 2111/04; G06F 2111/10; G06F 2119/02; G06F 30/18; G06F 30/25; G06F 30/27; G06F 2111/00; G06F 2111/06; G06F 2111/08; G06F 2111/12; G06F 2111/14; G06F 2111/16; G06F 2111/18; G06F 2111/20; G06F 2119/22; G06F 2113/00; G06F 2113/02; G06F 2113/04; G06F 2113/06; G06F 2113/08; G06F 2113/10; G06F 2113/12; G06F 2113/14; G06F 2113/16; G06F 2113/18; G06F 2113/20; G06F 2113/22; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/04; G06F 2119/06; G06F 2119/08; G06F 2119/10; G06F 2119/12; G06F 2119/14; G06F 2119/16; G06F 2119/18; G06F 2119/20; G06F 30/12; G06T 17/20
See application file for complete search history.

(56) References Cited

U.S. PATENT DOCUMENTS

| | | |
|---|---|---|
| 8,594,701 B2 | 11/2013 | Pakzad |
| 8,744,812 B2 | 6/2014 | Cruz |
| 9,285,227 B1 | 3/2016 | Chao et al. |
| 9,501,805 B2 | 11/2016 | McLean |
| 10,387,811 B2 | 8/2019 | Carnevale et al. |
| 10,691,081 B2 | 6/2020 | Ray et al. |
| 10,831,941 B2 | 11/2020 | Desai et al. |
| 10,917,740 B1 | 2/2021 | Scott et al. |
| 10,943,210 B2 | 3/2021 | Hance et al. |
| 11,209,798 B1 * | 12/2021 | Michalowski ..... G05B 19/4097 700/98 |
| 11,263,363 B2 | 3/2022 | Gifford |
| 11,271,222 B2 | 3/2022 | Dede et al. |
| 11,272,316 B2 | 3/2022 | Scott et al. |
| 2004/0034555 A1 | 2/2004 | Dismukes et al. |
| 2004/0078257 A1 | 4/2004 | Schweitzer et al. |
| 2004/0113945 A1 | 6/2004 | Park et al. |
| 2006/0217876 A1 | 9/2006 | Houri et al. |
| 2009/0300174 A1 | 12/2009 | Floris et al. |
| 2010/0198563 A1 | 8/2010 | Plewe |
| 2010/0218131 A1 | 8/2010 | Holm-Petersen et al. |
| 2012/0072181 A1 | 3/2012 | Imani |
| 2012/0096417 A1 | 4/2012 | Durbha et al. |
| 2013/0073344 A1 | 3/2013 | Parent |
| 2013/0197799 A1 | 8/2013 | Cho et al. |
| 2014/0278280 A1 | 9/2014 | Pardo-Fernandez |
| 2016/0012357 A1 | 1/2016 | Wood |
| 2016/0012359 A1 | 1/2016 | Wood |
| 2016/0161263 A1 | 6/2016 | Patel |
| 2018/0047121 A1 | 2/2018 | Bhattacharyya |
| 2018/0068255 A1 | 3/2018 | Hance et al. |
| 2018/0094936 A1 | 4/2018 | Jones et al. |
| 2018/0137214 A1 | 5/2018 | Benjamin et al. |
| 2018/0288850 A1 | 10/2018 | Kumar et al. |
| 2018/0300435 A1 | 10/2018 | Eckman et al. |
| 2018/0364719 A1 | 12/2018 | Wang et al. |
| 2018/0365347 A1 | 12/2018 | Wang et al. |
| 2019/0026949 A1 | 1/2019 | Alabastro et al. |
| 2019/0102486 A1 | 4/2019 | Desai et al. |
| 2019/0188338 A1 | 6/2019 | Srivastava et al. |
| 2019/0347367 A1 | 11/2019 | Livnat |
| 2019/0354641 A1 | 11/2019 | Masoud et al. |
| 2020/0034503 A1 | 1/2020 | Livnat |
| 2020/0104431 A1 | 4/2020 | Ginsberg |
| 2020/0272956 A1 | 8/2020 | Livnat |
| 2020/0311320 A1 | 10/2020 | Wang et al. |
| 2021/0073449 A1 | 3/2021 | Segev et al. |
| 2022/0007601 A1 | 1/2022 | Coffin et al. |

OTHER PUBLICATIONS

Bassett, E. M., and F. B. Williams. Municipal Zoning Enabling Act. Jun. 1958. (Year: 1958).*
Non Final Office Action received for U.S. Appl. No. 17/098,214 dated Feb. 18, 2022, 23 pages.
Rubin, Arthur, "Office Design Measurements for Productivity—A Research Overview", U.S. Department of Commerce, Dec. 1987, 78 pages.
Ranne et al., "People Flow Experience in Offices", A handbook for planning office spaces Kone Corporation, 2017, 24 pages.
Autodesk, "Factory Design Suite 2011", Accelerate your Factory Layout Process, 2011, 4 pages.
Tachikawa et al., "Office Layout Support System using Genetic Algorithm—Generation of Layout Plans for Polygonal Space—", 2010 Second World Congress on Nature and Bilogically Inspired Computer, Dec. 15-17, 2010, pp. 280-285.
Li et al., "A Constraint Based Generative System for Floor Layout Computer Science", 2000, pp. 417-426.
Anderson et al., "Augmented Space Planning: Using Procedural Generation to Automate Desk Layouts", International Journal of Architectural Computing, vol. 16, No. 2, 2018, pp. 164-177.
Non Final Office Action received for U.S. Appl. No. 17/098,282 dated Mar. 17, 2022, 18 pages.

(56) References Cited

OTHER PUBLICATIONS

Final Office Action received for U.S. Appl. No. 17/098,214 dated Jun. 1, 2022, 40 pages.
Dorismond, Jessica, "Supermarket Optimization: Simulation Modeling and Analysis of a Grocery Store Layout", University at Buffalo, State University of New York, 2016, pp. 3656-3657.
Ozgormus, Elif, "Optimization of Block Layout for Grocery Stores", Auburn University, 2015, pp. 134 pages.
Bhadury et al., "Store Layout Using Location Modeling To Increase Purchases", University of North Carolina at Greensboro, 2016, pp. 1-32.
International Search Report for application No. PCT/US2020/060861 dated Feb. 11, 2021.
Non Final Office Action received for U.S. Appl. No. 17/098,214 dated Sep. 19, 2022, 24 pages.
Seppanen et al., "Facilities Planning with Graph Theory", Management Science, vol. 17, No. 4, Dec. 1970, pp. B-242-B253.
Nagy, Danil, "Routing with graphs", Generative Design, Mar. 2, 2018, 14 pages.
Liggett, Robin S., "Automated facilities layout: past, present and future" Automation in Construction, vol. 9, 2000, pp. 197-215.
Homayouni, Hoda, "A Survey of Computational Approaches to Space Layout Planning (1965-2000)", 2007, 18 pages.
Bahrehmand et al., "Optimizing Layout using Spatial Quality Metrics and User Preferences", Graphical Models, vol. 93, 2017, pp. 25-38.
Watson, Kelvin, "Graph Theoretic Facility Layout Design and Evaluation: Theoretical and Practical Considerations", Jan. 1996, 369 pages.
Final Office Action received for U.S. Appl. No. 17/098,282 dated Aug. 5, 2022, 27 pages.
Murakami et al. "Coupled Simulations of indoor-outdoor flow fields for cross-ventilation of a building in a simplified urban array", Atmosphere, vol. 9, Jun. 4, 2018, 16 pages.
Chen et al., "Numerical Simulations of Noise Induced by Flow in HVAC Ventilation Ducts", SAE International Journal of Materials and Manufacturing, vol. 4, No. 1, 2011, pp. 696-707.
Non Final Office Action received for U.S. Appl. No. 17/098,291 dated Sep. 16, 2022, 60 pages.
Flack et al., "Evolution of Architectural Floor Plans", European conference on the applications of evolutionary computation, 2011, pp. 313-322.
Cascio et al., "Residential Building Retrofit through Numerical Simulation: A Case Study", Energy Procedia, vol. 111, 2017, pp. 91-100.
Koenig et al., "Comparing two evolutionary algorithm based methods for layout generation: Dense packing versus subdivision", AI EDAM, vol. 28, No. 3, 2014, pp. 285-299.
Almhafdy et al., "Courtyard Design Variants and Microclimate Performance", Procedia—Social and Behavioral Sciences, https://doi.org/10.1016/j.sbspro.2013.07.190, vol. 101, 2013, pp. 170-180.
Notice of Allowance received for U.S. Appl. No. 17/098,282 dated Oct. 20, 2022, 13 pages.
Final Office Action received for U.S. Appl. No. 17/098,214 dated Jan. 9, 2023, 33 pages.
Final Office Action received for U.S. Appl. No. 17/098,291 dated Jan. 26, 2023, 46 pages.
Non Final Office Action received for U.S. Appl. No. 17/098,280 dated Nov. 3, 2022, 38 pages.
Azhar et al., "Building Information Modeling for Sustainable Design and LEED® Rating Analysis", Automation in Construction, vol. 20, No. 2, 2010, pp. 217-224.
Final Office Action received for U.S. Appl. No. 17/098,280 dated Mar. 6, 2023, 33 pages.
Non Final Office Action received for U.S. Appl. No. 17/098,214 dated Apr. 17, 2023, 35 pages.
Non Final Office Action received for U.S. Appl. No. 17/098,228 dated Mar. 23, 2023, 65 pages.
Soltani et al., "A fuzzy based multi-objective path planning of construction sites", Automation in Construction, vol. 13, No. 6, 2004, pp. 717-734.
Final Office Action received for U.S. Appl. No. 17/098,214 dated Jul. 26, 2023, 26 pages.
Final Office Action received for U.S. Appl. No. 17/098,228 dated Aug. 14, 2023, 49 pages.
Non Final Office Action received for U.S. Appl. No. 17/098,291 dated Aug. 23, 2023, 41 pages.
Notice of Allowance received for U.S. Appl. No. 17/098,280 dated Sep. 7, 2023, 17 pages.

* cited by examiner

OPTIMIZING BUILDING DESIGN FOR FUTURE TRANSFORMATION AND EXPANSION

CROSS-REFERENCE TO RELATED APPLICATIONS

This application claims the priority benefit of U.S. Provisional Patent Application titled: "Computer-Implemented Techniques for Designing Factories and Workspaces," and filed on Nov. 18, 2019 having Ser. No. 62/937,190. The subject matter of this related application is hereby incorporated by reference.

BACKGROUND

Field of the Various Embodiments

The present invention relates generally to computer science and computer-aided design and, more specifically, to computer-implemented techniques for optimizing building design for future transformation and expansion.

Description of the Related Art

Generating a building design and layout, such as for a building or workplace, oftentimes is a complex process where many different design goals as well as numerous constraints and requirements must be considered. For example, when designing a building or other similarly intricate industrial building, a designer has to consider, among other things, operating requirements, production requirements, architectural and engineering constraints, cost constraints, and building site constraints.

With respect to the building site and other engineering constraints, the design typically reflects the current needs and goals of a project. For example, a factory may be designed based on a desired production capacity or goal, and for producing specific products. However, buildings often remain in use after the initial time frame contemplated by the design has passed, and the needs and goals of the project may have changed. The original building design may not be able to accommodate change and expansion to meet the new needs and goals.

One drawback to using conventional CAD software when designing industrial buildings is that much of the information needed to properly model and simulate the future goals and needs of the factory or workspace via the simulation methods incorporated into conventional CAD software is not available or determined until a significant time after the building is constructed. Unlike known design goals, metrics and measurements cannot be used to evaluate how different elements of the building design and layout meet the future goals and needs of the factory. Thus, design optimization components in the design analysis process cannot incorporate such data into the analysis. Such gaps in data result in building designs that do not optimally account for future changes and expansions to the building. As a result, generating layouts for an industrial building using conventional CAD software involves an ad-hoc trial-and-error approach.

As the foregoing illustrates, what is needed in the art are more effective techniques for optimizing building design to account for future changes and expansion.

SUMMARY

One embodiment of the present application sets forth a computer-implemented method for evaluating expansion and development areas of a site. The method includes receiving a building geometry indicating a size of a building and a shape of the building; receiving building placement data indicating a placement of the building within a site; identifying one or more remaining spaces within the site based at least on the size of the building, the shape of the building, and the placement of the building within the site; for each remaining space of the one or more remaining spaces: determining whether the remaining space is a usable space; based on the determining whether the remaining space is a usable space, generating a space expansion value corresponding to the remaining space; and computing, based on space expansion values corresponding to the one or more remaining spaces, one or more aggregate expansion values associated with the building geometry and the building placement.

At least one technical advantage of the disclosed techniques relative to the prior art is that the disclosed techniques can be incorporated into a CAD application to enable the CAD application to automatically explore a design space to identify building layouts that optimize for future expansion or goals of the site and building. Accordingly, with the disclosed techniques, a CAD application can generate a substantially larger number of building designs that, for example, are optimized for future expansion, relative to a conventional CAD application. This functionality, which is not available in conventional CAD applications, increases the likelihood that an optimal layout design can be automatically generated and identified for a given building design. These technical advantages represent one or more tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
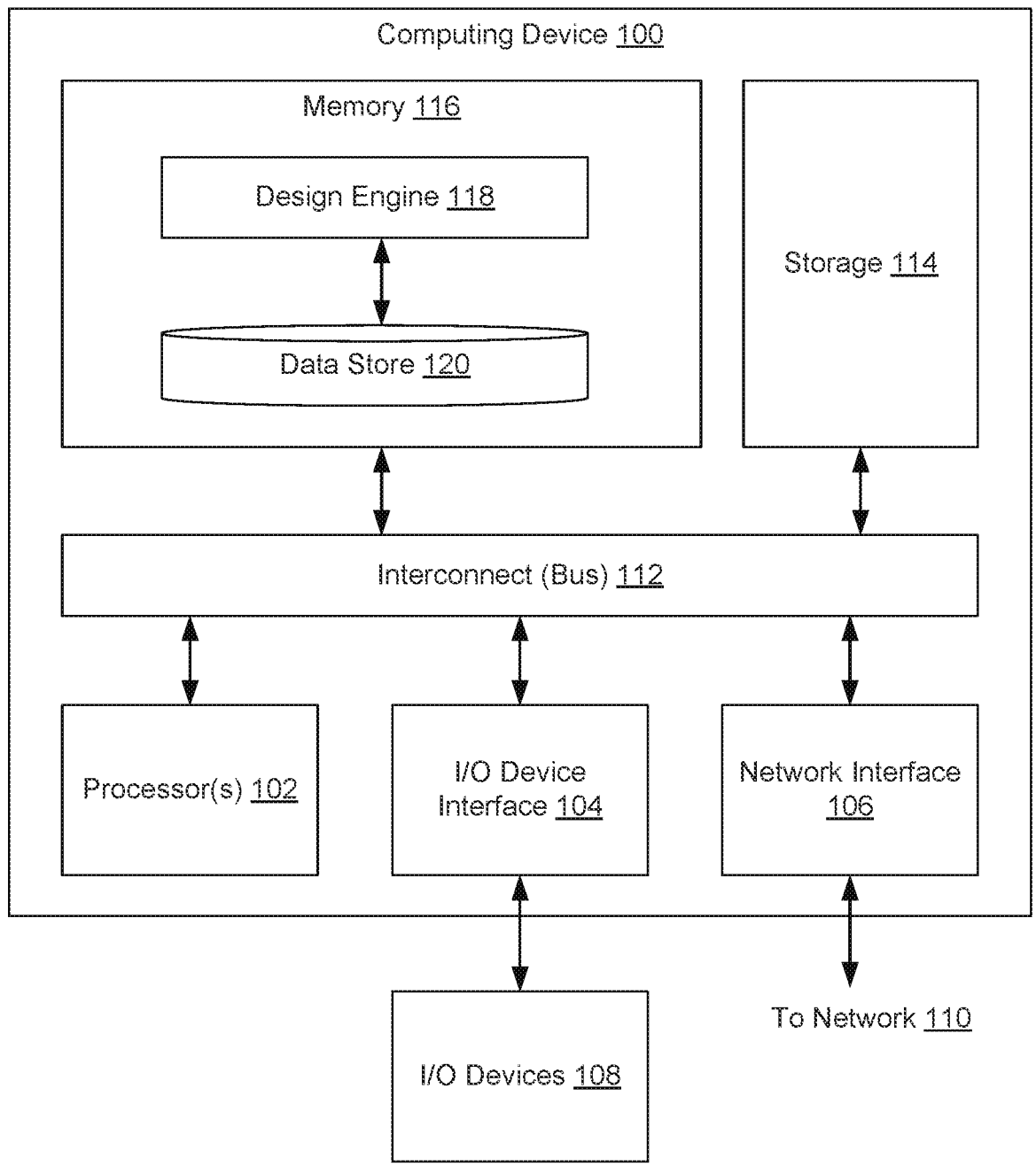
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Design engine 118 and data store 120 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including design engine 118 and data store 120. Design engine 118 and data store 120 are described in further detail below with respect to FIG. 2.

Figure 2:
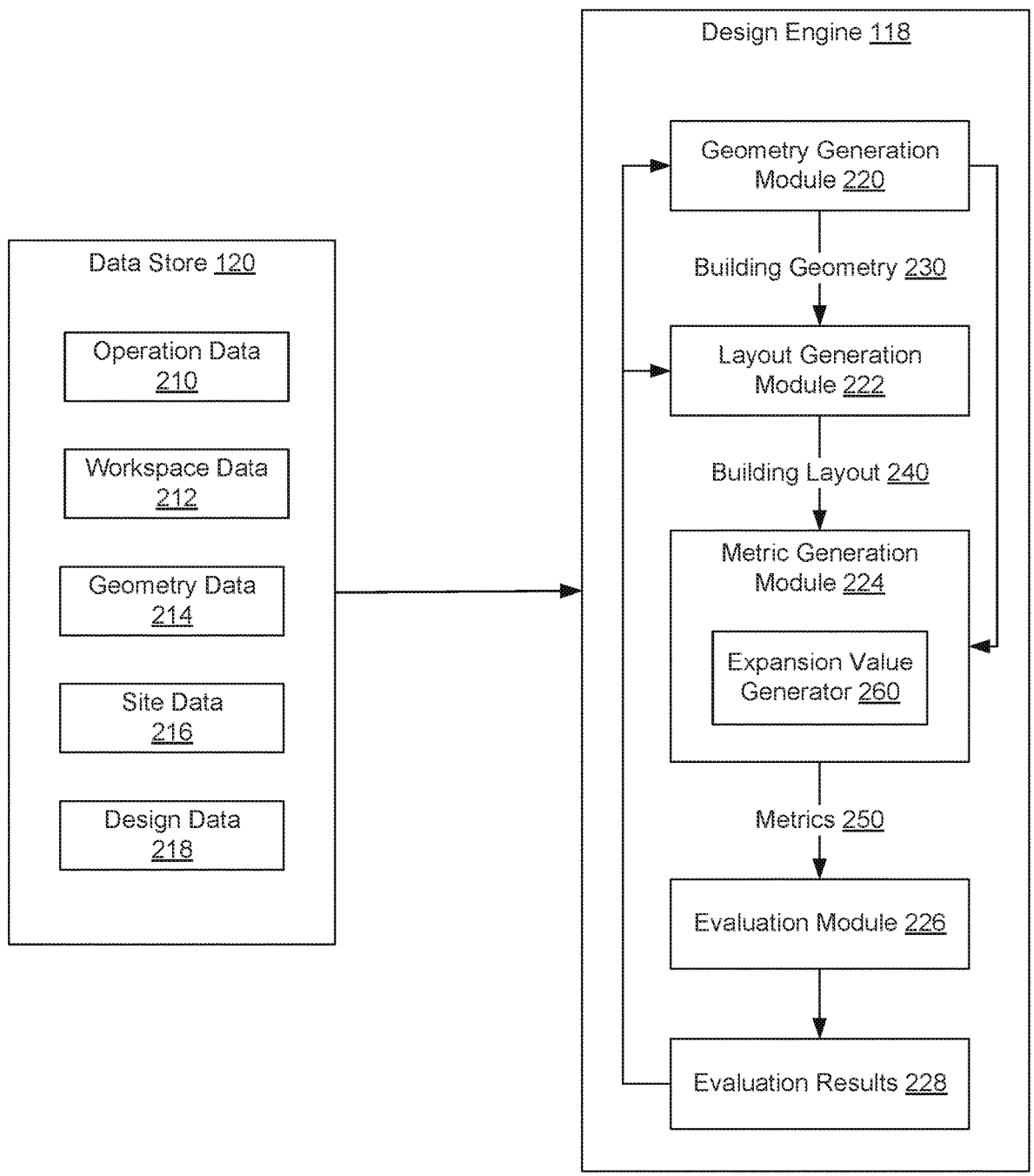
FIG. 2 is a more detailed illustration of the data store and design engine of FIG. 1, according to various embodiments of the present disclosure.

In operation, design engine 118 is configured to design and optimize buildings such as factories or other workplaces. Design engine 118 receives input from data store 120 that describes various aspects of the building being designed, such as a site on which the building is to be built, operations to be performed in the building, and various other constraints and requirements for the building. Design engine 118 generates a spectrum of potential building designs based on the received input. A building design may include for example, a building footprint; building geometry such as a floorplan and/or a three-dimensional model of the building; a layout of rooms, systems, infrastructure, and other elements of the building; and a layout of the building within a site, such as a location and/or orientation of the building in the site. Design engine 118 evaluates the generated designs based on various criteria. Design engine 118 uses the results of the evaluation to further optimize and refine the generated designs to produce additional building designs. Additionally, design engine 118 presents the results of the evaluation to an end user. Design engine 118 implements various software modules in order to generate and optimize building designs. These software modules are discussed in greater detail below in conjunction with FIG. 2, FIG. 2 is a more detailed illustration of design engine 118 and data store 120 of FIG. 1, according to various embodiments of the present disclosure. As shown, design engine 118 is coupled to data store 120 and includes, without limitation, geometry generation module 220, layout generation module 222, metric generation module 224, evaluation module 226, and evaluation results 228.

In one or more embodiments, design engine 118 obtains data describing requirements and constraints associated with generating building designs for the building from data store 120. Additionally, in some embodiments, design engine 118 may store generated data, such as building geometries, building layouts, metrics associated with a building geometry or building layout, and/or evaluation results, to data store 120. As shown in FIG. 2, data store 120 includes, without limitation, operation data 210, workspace data 212, geometry data 214, site data 216, and design data 218.

Operation data 210 includes data describing operations of the building. For example, data describing operations of a factory may include data indicating workstations, operators, personnel, schedules, zones, positions, tools, storage facilities, parts, materials, equipment, transport requirements or restrictions, or other elements and features associated with operations of the factory. Additionally, the data describing the factory operations may include data describing the elements and features associated with operations of the factory, such as weights of parts and materials. As another example, data describing operations of a workplace may include data indicating office spaces, desks, meeting rooms, common areas, amenities such as restrooms or breakrooms, staff, office personnel, schedules, zones, equipment, space requirements or restrictions, or other elements and features associated with the workplace. Additionally, the data describing the workplace operations may include data describing the elements and features associated with the workplace, such as the number of offices, desks, common areas, and amenities.

Workspace data 212 includes data describing workstations or workspaces of the building. For example, data describing a workstation may include data indicating one or more operations associated with the workstation, one or more operation tasks associated with the workstation, dimensions of the workstation, a shape of the workstation, or other information related to the workstation. As another example, data describing a workspace may include data indicating one or more personnel types associated with the workspace, one or more categories or functions associated with the workspace, a shape of the workspace, dimensions of the workspace, a type and number of elements associated with the workspace such as desks, tables, and seating, or other information related to the workspace. A workspace may generally refer to any defined space within the building, open or enclosed, for employees to perform work, such as a meeting room, office, group of desks, group of cubicles, and so forth.

Geometry data 214 includes data describing the building. For example, the data describing the building may include data indicating a size of the building, a shape of the building, a footprint of the building, an orientation of the building structural elements of the building, fixed equipment within the building and locations of the fixed equipment, and infrastructure of the budding such as loading docks, entrances, exits, and mechanical systems. In some embodiments, geometry data 214 includes a three-dimensional (3D) model of the building, a wireframe model of the building, a surface mesh of the building, a footprint of the building, a floorplan of the building, images or renders of the building from one or more views, and/or other visualizations of the building geometry. The geometry data 214 may be data that was generated by design engine 118, data received from another application or tool, data entered or otherwise provided by a user, or a combination thereof.

In some embodiments, geometry data 214 includes a layout indicating locations of workstations or workspaces within the building. The layout may be generated by design engine 118, generated by another application or tool, or designed by a user. In some embodiments, design engine 118 generates the layout for the building based on information describing the building, such as operation data 210 and workspace data 212. In some embodiments, geometry data 214 includes one or more visualizations of the building, and the visualizations may include visualizations of workstations and workspaces within the building according to the layout.

Site data 216 includes data describing a site at which the building is to be constructed. For example, the data describing the site may include data indicating a location of the site, a size of the site, a shape of the site, an orientation of the site, fixed equipment within the site and locations of the fixed equipment, utilities around or underneath the site, topography of the site, elevation(s) of the site, soil conditions of the site, restriction(s) on the site, and infrastructure of the site such as roads and paths.

Additionally, in some embodiments, site data 216 may include data describing one or more adjacent sites. For example, data describing an adjacent site may include data indicating a location of the adjacent site, a relative location of the adjacent site with respect to the site, a size of the adjacent site, a shape of the adjacent site, an orientation of the adjacent site, fixed equipment within the adjacent site and locations of the fixed equipment, utilities around or underneath the adjacent site, topography of the adjacent site, elevation(s) of the adjacent site, soil conditions of the adjacent site, restriction(s) on the adjacent site, infrastructure of the adjacent site such as roads and paths. Additionally, in some embodiments, the data describing the adjacent site may include data indicating one or more costs associated with the adjacent site, such as zoning costs, permitting costs, purchasing costs, and so forth.

Design data 218 includes data associated with one or more designs of the building. For example, data describing a building design may include restrictions and requirements associated with the building design, such as production requirements (e.g. number of workstations, number of production bays, target production rate, target production efficiency), workspace requirements (e.g. number of desks, number of common areas and amenities, number of meeting rooms), building size requirements, capacity requirements, infrastructure requirements, system requirements, accessibility requirements, architectural and engineering constraints, and so forth.

In some embodiments, design data 218 includes data describing materials associated with the building design, such as windows, doors, cladding, piping and plumbing types and sizes, wiring types and sizes, and mechanical systems such as heating, ventilation and air conditioning (HVAC) systems. The data describing the materials may include estimated costs for each material.

In some embodiments, design data 218 includes data indicating one or more aspects of the building design of which future expansion may be explored, such as building expansion size, workspace or workstation expansion size, production requirements, capacity requirements, future workspace requirements, one or more operations or types of operations, or one or more workspaces or types of workspaces. Additionally, the data indicating numeric design aspects, such as expansion sizes or requirements, may include predicted values, minimum values, or a range of values corresponding to each aspect.

In operation, geometry generation module 220 receives site data 216 and design data 218 from data store 120 and generates a building geometry 230. Building geometry 230 indicates the size and shape of the building. In some embodiments, generating building geometry 230 includes generating a visualization of the building geometry, such as a 2D footprint of the budding and/or a 3D model of the budding. In some embodiments, budding geometry 230 also indicates a placement of the budding within the site, such as location and orientation of the budding on the site.

Layout generation module 222 receives operation data 210 and workspace data 212, and generates a layout 240 associated with the budding (also referred to herein as "building layout 240"). Layout 240 indicates locations within a building, such as a factory, for a plurality of workstations or workspaces of the building. In some embodiments, layout 240 also indicates locations within the building of other rooms or elements of the building, such as storage facilities, tools, supplies, entrances, exits, elevators, stairs, material transport paths or structures, or other rooms or elements used by factory or workplace operations. In one or more embodiments, generating the layout 240 is based on a pre-defined building geometry, such as building geometry 230 and/or geometry data 214. Layout generation module 222 receives building geometry 230 and/or geometry data 214, and determines locations for the workstations, workspaces, and other rooms or elements of the building within the boundaries of the building indicated by the pre-defined geometry.

Metric generation module 224 receives building geometry 230 and/or building layout 240 and generates one or more metrics 250 associated with the building design based on the building geometry 230 and/or the building layout 240. In some embodiments, metric generation module 224 also receives one or more of operation data 210, workspace data 212, geometry data 214, site data 216, or design data 218, and generating the one or more metrics 250 is further based on the received data.

In some embodiments, each metric 250 corresponds to a particular design goal for the building, such as minimizing construction cost, target square footage, lot efficiency goals, production goals, productivity goals, occupancy or capacity goals, energy usage targets, ventilation and air flow targets, maximizing or minimizing light exposure, workflow or operational efficiency goals, sustainability goals, and so forth. Each metric 250 may be a value or measurement associated with the corresponding design goal.

Metric 250 includes one or more expansion values that correspond to budding expansion design goals. An expansion value indicates the a property of a site layout to accommodate future expansion of a budding on the site. As shown, metric generation module 224 includes expansion value generator 260 for generating the one or more expansion values.

Expansion value generator 260 generates the one or more expansion values based on building geometry for the building and data describing the site at which the building is to be constructed. The budding geometry may be a building geometry generated by geometry generation module 220, a building geometry generated by another application or tool, or a building geometry received from data store 120. The building geometry indicates a size and shape of the building. Additionally, in some embodiments, the building geometry indicates a placement of the building within the site, such as location and orientation of the building on the site. In other embodiments, expansion value generator 260 receives geometry data 214 that indicates the placement of the building within the site. The data describing the site may include data indicating a size and shape of the site. Additionally, in some embodiments, the data describing the site may include data describing one or more adjacent sites. The site data may be received from data store 120, from another application or data source, or from a user via user input. In one or more embodiments, expansion value generator 260 generates the one or more expansion values based on the size of the building, the shape of the building, and the placement of the building within the site.

In one or more embodiments, generating the one or more expansion values is further based on a building layout 240 of the building. The building layout may be a layout generated by layout generation module 222, a layout generated by another application or tool, or a layout received from data store 120. The building layout 240 indicates the locations within the building of workspaces or workstations of the building.

In one or more embodiments, generating the one or more expansion values is further based on workspace data 212 associated with the workstations or workspaces in the building layout 240. The workspace data 212 may include, for example, data indicating one or more operations associated with the workstation, one or more operation tasks associated with the workstation, dimensions of the workstation, a shape of the workstation, and other information related to the workstation.

In one or more embodiments, generating the one or more expansion values is further based on design data 218 associated with the building design. The design data 218 may include, for example, data indicating restrictions and requirements associated with the building design, such as production requirements (e.g. number of workstations, number of production bays, target production rate, target production efficiency), workspace requirements (e.g., number of desks, number of common areas and amenities, number of meeting rooms), building size requirements, capacity requirements, infrastructure requirements, system requirements, accessibility requirements, architectural and engineering constraints, and other information related to the building design.

Additionally, in some embodiments, design data 218 includes data indicating one or more aspects of the building design of which future expansion may be explored, such as minimum expansion size, production requirements, capacity requirements, workspace requirements, one or more operations or types of operations, or one or more workspaces or types of workspaces.

In one or more embodiments, to generate the one or more expansion values, expansion value generator 260 identifies one or more remaining spaces within the site. A remaining space is a portion of the site that is not occupied by the building. Additionally, in some embodiments, the remaining space is not occupied by other structures on the site or features of the site, such as courtyards, parking lots, water features, infrastructure, and so forth.

In some embodiments, identifying the one or more remaining spaces is based on the placement of the building on the site. For example, expansion value generator 260 may receive a building geometry that indicates a size of the building, a shape of the building, a location of the building within the site, and an orientation of the building within the site, and site data indicating a size and shape of the site. Expansion value generator 260 calculates a placement of the budding on the site based on the building geometry and the site data, and determines which areas of the site are not covered by the building.

Additionally, in some embodiments, identifying the one or more remaining spaces is based on site data describing one or more sites adjacent to the site. Identifying the one or more remaining spaces may include identifying available areas in the one or more adjacent sites.

Figure 3:
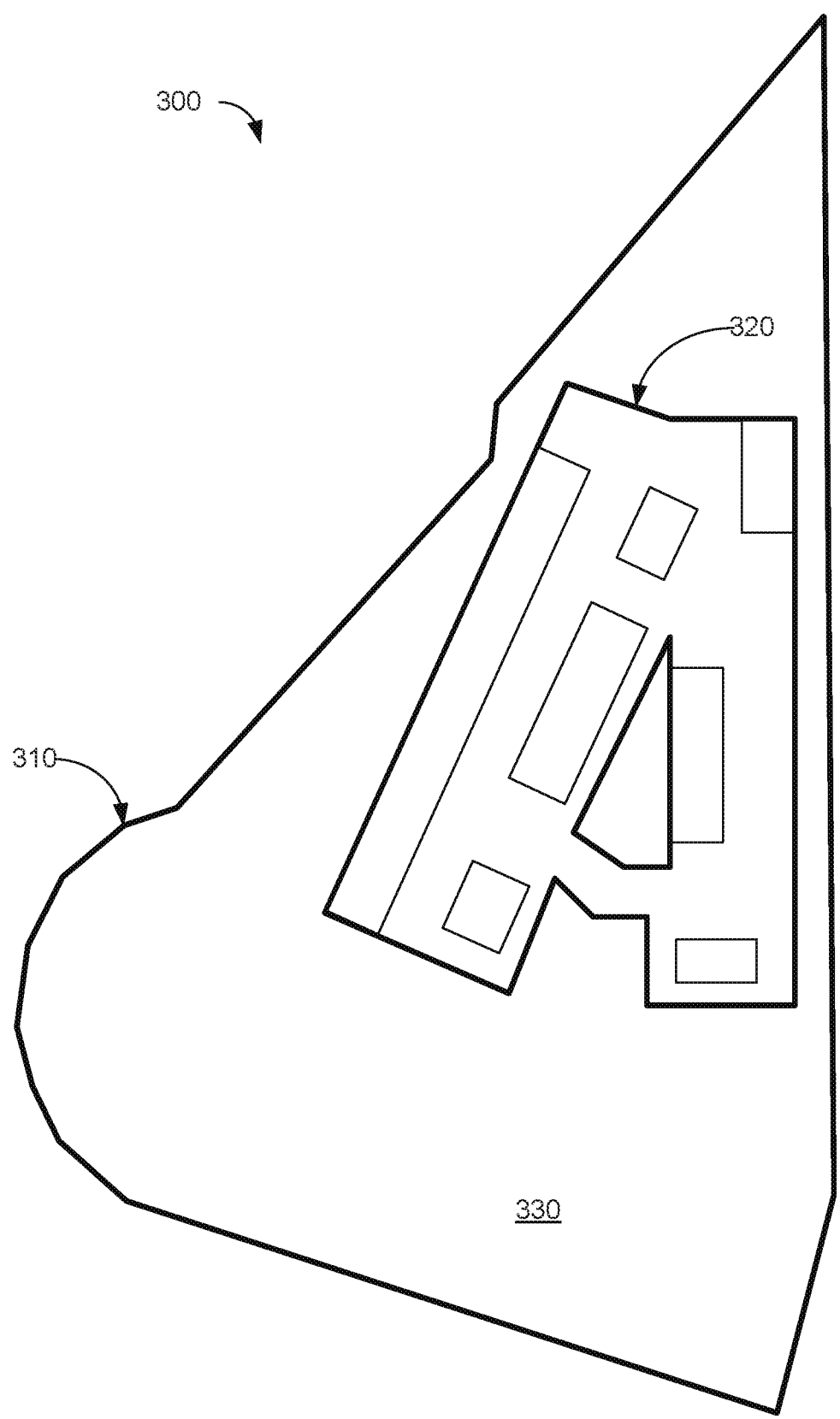
FIG. 3 illustrates an exemplary building and site layout associated with the design engine of FIG. 1, according to various embodiments of the present disclosure.

FIG. 3 illustrates an example building and site layout 300. As shown, the layout 300 includes a site 310 and a building 320. Additionally, the layout 300 includes a non-occupied site area 330. The non-occupied site area 330 is the area within the site 310 that is not occupied by the building 320. As shown in FIG. 3, the size and shape of building 320, as well as the placement of building 320 on site 310, e.g., the location of building 320 within site 310 and the orientation at which building 320 is placed, affect the size, shape, and location of non-occupied site area 330.

In some embodiments, identifying the one or more remaining spaces based on placement of the building on the site includes generating a layout that indicates the location within the site of the building. For example, expansion value generator 260 may receive building geometry 230 and site data 216, and generate layout 300 based on building geometry 230 and site data 216. Expansion value generator 260 uses the generated layout to determine which areas of the site are not covered by the building. Additionally, in some embodiments, the layout may indicate the locations of one or more other structures on the site. Expansion value generator 260 may determine which areas of the site are not covered by either the building or by other structures.

In some embodiments, identifying the one or more remaining spaces includes identifying one or more contiguous portions of the site within the non-occupied site area. Each remaining space of the one or more remaining spaces corresponds to a different contiguous portion of the site. Referring to FIG. 3, non-occupied site area 330 is a single, contiguous portion of the site 310. Expansion value generator 260 determines, based on layout 300, one remaining space that corresponds to the entire non-occupied site area 330.

In some embodiments, identifying the one or more remaining spaces includes expanding the building along one or more axis of the building into the non-occupied site area. Each remaining space of the one or more remaining spaces corresponds to a different expanded portion of the building. Each axis of the building may correspond to an exterior wall of the building. For example, a rectangular building may be expanded along four sides of the building, left, right, front, and back. The amount that each axis of the building can be extended may vary depending on the amount of non-occupied site area available in the direction in which the axis is being extended. In some embodiments, expansion value generator 260 selects the one or more axis of the building to expand based on the amount of space available in which to expand each axis.

Figure 4:
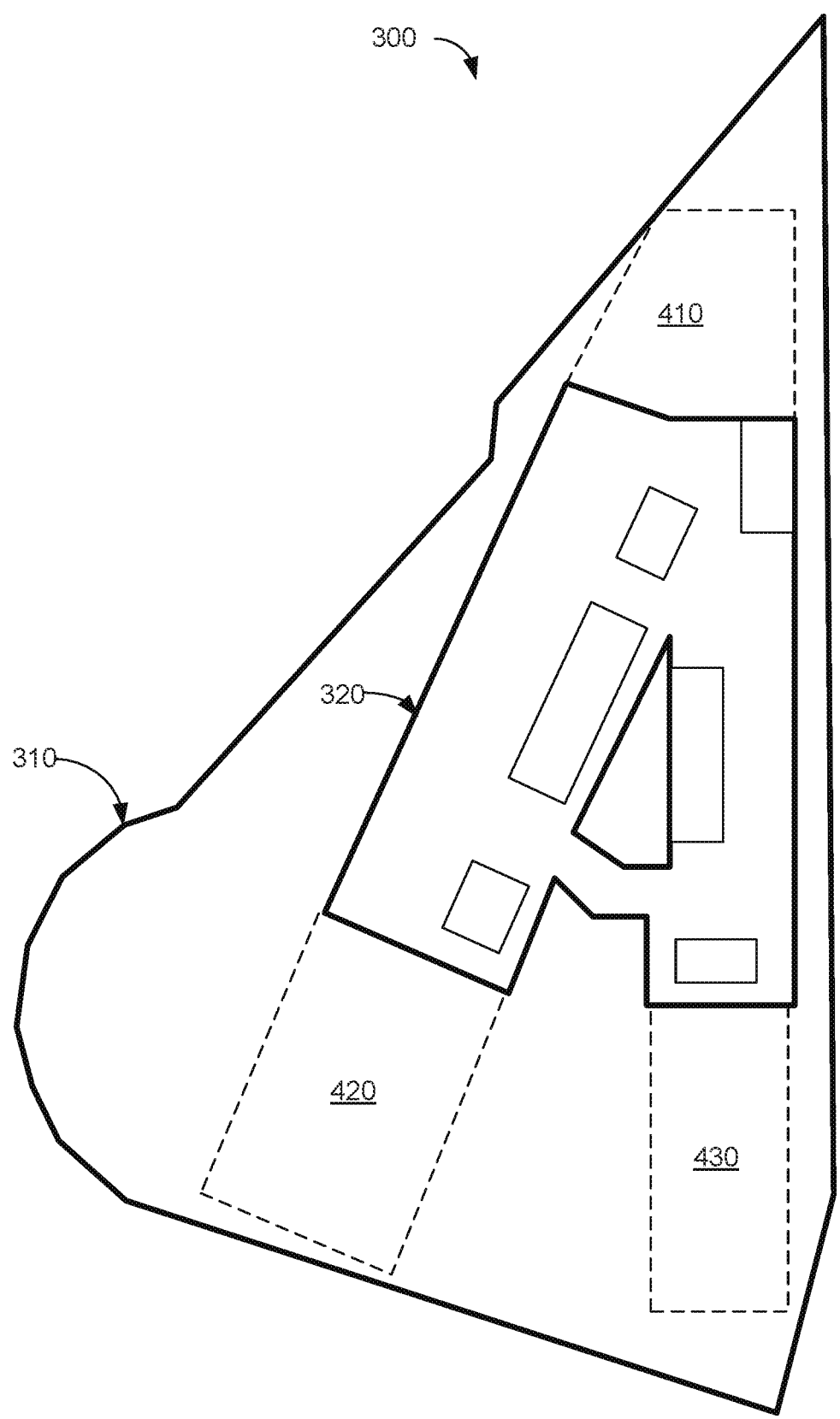
FIG. 4 illustrates exemplary expansions of the building layout of FIG. 3, according to various embodiments of the present disclosure.

FIG. 4 illustrates exemplary expansions of building 320 of FIG. 3, according to various embodiments. As shown, building 320 is expanded along a first axis to generate expanded portion 410, along a second axis to generate expanded portion 420, and along a third axis to generate expanded portion 430. Expansion value generator 260 identifies three remaining spaces based on the illustrated expansion of building 320, corresponding to the expanded portions 410-430.

In some embodiments, identifying the one or more remaining spaces includes dividing the non-occupied site area into a plurality of portions. Each remaining space of the one or more remaining spaces corresponds to a different portion of the plurality of portions.

Figure 5:
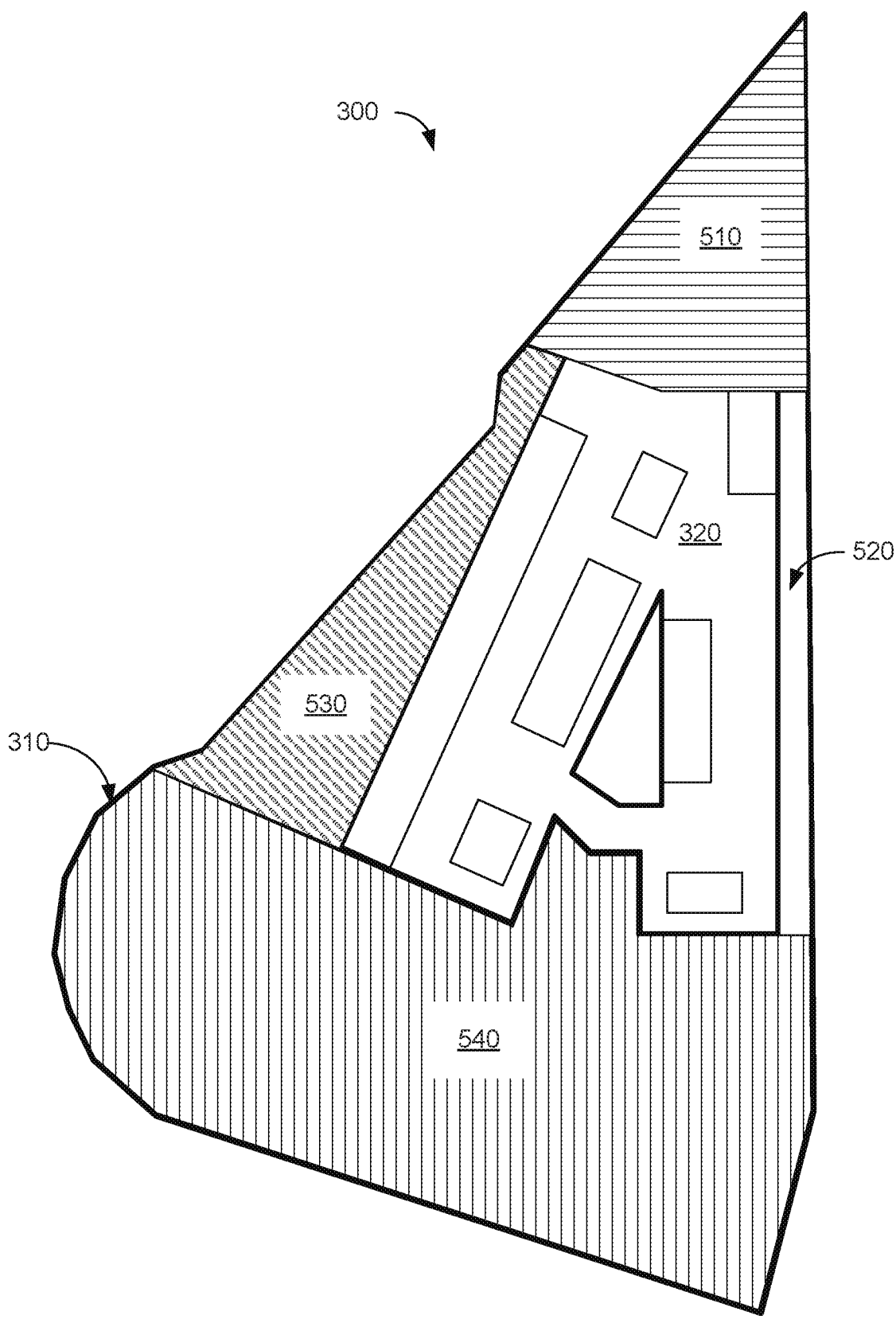
FIG. 5 illustrates exemplary divided portions of the non-occupied site area of FIG. 3, according to various embodiments of the present disclosure.

FIG. 5 illustrates exemplary divided portions of the non-occupied site area 330 of FIG. 3, according to various embodiments. As shown, non-occupied site area 330 is divided into four portions, portion 510, portion 520, portion 530, and portion 540. Expansion value generator 260 identifies four remaining spaces based on the illustrated division of non-occupied site area 330, corresponding to the portions 510-540.

In some embodiments, expansion value generator 260 divides the non-occupied site area into a plurality of portions based on the edges of a building footprint of the building. Expansion value generator 260 selects one or more edges of the building footprint and extends each selected edge towards a boundary of the site. The extended edges form dividing lines along which the non-occupied site area may be divided. For example, referring to FIG. 5, to generate portion 510, expansion value generator 260 may select the top-right edge of building 320 and extend the edge towards the right boundary of site 310. Expansion value generator 260 may then select the top-left edge of building 320 and extend the edge towards the left boundary of site 310. The extended edges form the bottom boundary of portion 510 and the top boundaries of portions 520 and 530.

In some embodiments, expansion value generator 260 divides the non-occupied site area into a plurality of portions based on the sides of the building. Expansion value generator 260 divides the non-occupied site area into a plurality of portions where each portion corresponds to a different side of the building. For example, referring to FIG. 5, expansion value generator 260 may determine the locations of each side of building 320 and divide non-occupied site area 330 into four portions corresponding to the four sides of building 320. Portion 510 corresponds to the top side of building 320, portion 520 corresponds to the right side of building 320, portion 530 corresponds to the left side of building 320, and portion 540 corresponds to the bottom side of building 320.

In some embodiments, after identifying the one or more remaining spaces within the site, expansion value generator 260 determines, for each remaining space, whether the remaining space is a usable space. A usable space is a space into which the building may be expanded to accommodate additional elements of the building, such as operations, workspaces or workstations, storage facilities, transport paths or structures, building systems, and so forth, and/or a space that satisfies one or more expansion criteria. A remaining space may be a non-usable space if the remaining space cannot accommodate additional elements of the building and/or does not satisfy one or more expansion criteria or requirements.

In some embodiments, determining whether a remaining space is a usable space is based on a size of the remaining space. For example, expansion value generator 260 may calculate a size of the remaining shape and determine, based on the size, whether the size can accommodate one or more elements of the building, such as operations, workspaces or workstations, storage facilities, transport paths or structures, or building systems. As another example, expansion value generator 260 may determine whether the size of the remaining shape exceeds a threshold size. The threshold size may be a threshold length, width, and/or area of a usable space.

In some embodiments, determining whether the remaining space is a usable space is based on one or more workspaces or workstations of the building. For example, workspace data 212 may include data indicating dimensions of workspaces or workstations of the building. Expansion value generator 260 determines the size of a workspace or workstation and determines, based on the size of the workspace or workstation and the size of the remaining space, whether the workstation or workspace can fit in the remaining space. In some embodiments, expansion value generator 260 determines that the remaining space is a usable space if the remaining space can fit at least one workspace or workstation of the building. In some embodiments, expansion value generator 260 determines that the remaining space is a usable space if the remaining space can fit one or more specified workspaces or workstations of the building. In some embodiments, expansion value generator 260 determines that the remaining space is a usable space if the remaining space can fit a threshold number of workspaces or workstations of the building.

In some embodiments, determining whether the remaining space is a usable space is based on one or more operations of the building. As an example, operation data 210 may indicate one or more elements of the building associated with an operation. Expansion value generator 260 determines, based on operation data 210, the one or more elements of the building associated with the operation and calculates an amount of space needed for the one or more elements. Expansion value generator 260 determines, based on the size of the remaining space and the amount of space needed for the one or more elements, whether the operation can fit in the remaining space. In some embodiments, expansion value generator 260 determines that the remaining space is a usable space if the remaining space can fit at least one operation of the building. In some embodiments, expansion value generator 260 determines that the remaining space is a usable space if the remaining space can fit one or more specified operations of the building. In some embodiments, expansion value generator 260 determines that the remaining space is a usable space if the remaining space can fit a threshold number of operations of the building.

In some embodiments, determining whether the remaining space is a usable space is based on design data. For example, design data 218 may include data indicating one or more aspects of the building design of which future expansion may be explored, such as building expansion size, workspace or workstation expansion size, production requirements, capacity requirements, future workspace requirements, one or more operations or types of operations, or one or more workspaces or types of workspaces. For each aspect of the one or more aspects, expansion value generator 260 evaluates the remaining space based on the aspect. For example, if an aspect specifies a building expansion size, expansion value generator 260 determines whether the remaining space meets the building expansion size. As another example, if an aspect specifies a number of additional workspaces, expansion value generator 260 determines whether the remaining space can accommodate the additional workspaces. Determining whether the remaining space can accommodate a workspace, workstation, or operation may be performed in a manner similar to that discussed above.

In one or more embodiments, expansion value generator 260 generates, for each remaining space of the one or more remaining spaces, one or more respective space expansion values. The respective space expansion value is a metric or measurement associated with the remaining space. The respective space expansion value indicates whether the remaining space is a usable space and/or an amount of expansion that the remaining space can accommodate. For example, expansion value generator 260 may generate a space expansion value of 1 for a usable space and a space expansion value of 0 for a non-usable space. As another example, expansion value generator 260 may generate a space expansion value indicating a ratio between a size of the remaining space and a target expansion size, such as a size of a workstation, workspace, operation, or a specified building expansion size.

In some embodiments, generating the one or more respective space expansion values includes calculating a cost of expansion associated with the remaining space. For example, if a remaining space can fit particular operation, expansion value generator 260 may calculate a cost of expanding the building into the remaining space to add the particular operation. As another example, a remaining space includes areas of an adjacent site, expansion value generator 260 may calculate a cost associated with expanding onto the adjacent site, such as a purchase cost of the adjacent site.

In one or more embodiments, expansion value generator 260 calculates one or more aggregate expansion values based on the space expansion values for the one or more remaining spaces. Calculating the aggregate expansion values may include, for example, adding, averaging, or otherwise combining the space expansion values for the one or more remaining spaces.

In some embodiments, expansion value generator 260 generates a plurality of space expansion values for each remaining space, where each space expansion value corresponds to a different approach for determining whether the remaining space is a usable space. Expansion value generator 260 calculates, for each approach, an aggregate expansion value corresponding to the approach. For example, a first space expansion value may indicate whether a size of the remaining space is greater than a threshold size; a second space expansion value may indicate whether the remaining space can fit a particular operation of the building; a third space expansion value may indicate a number of workspaces that can fit in the remaining space. Expansion value generator 260 may calculate a first aggregate expansion value based on the first space expansion values for the one or more remaining spaces, a second aggregate expansion value based on the second space expansion values for the one or more remaining spaces, and a third aggregate expansion value based on the third space expansion values for the one or more remaining spaces.

In one or more embodiments, expansion value generator 260 identifies multiple sets of remaining spaces, where each set of remaining spaces is identified using a different approach discussed above. Expansion value generator 260 calculates, for each set of remaining spaces, one or more respective aggregate expansion values corresponding to the approach. The metrics or measurements associated with the respective aggregate expansion values may differ based on the approach. Expansion value generator 260 may select the metrics or measurements for which to calculate aggregate expansion values based on the approach used to identify the set of remaining spaces. For example, a first set of remaining spaces may be identified based on extending the building along one or more axis. Expansion value generator 260 may calculate an aggregate expansion value that indicates a ratio between the size of the extended building compared to a size of the original building. Expansion value generator 260 does not calculate this aggregate expansion value for a second set of remaining spaces that were identified based on a different approach that did not involve extending the building along various axis.

In one or more embodiments, expansion value generator 260 calculates the one or more aggregate expansion values that are normalized values, such as, a value between 0 and 1 or a value between 0 and 100. For example, expansion value generator 260 may calculate an aggregate expansion value that indicates a ratio between the area of the non-occupied site area(s) and the perimeter of the non-occupied site area(s). As another example, expansion value generator 260 may calculate an aggregate expansion value that indicates a ratio between the total amount of usable remaining space compared to the total amount of unusable remaining space. As a third example, expansion value generator 260 may calculate an aggregate expansion value that indicates a ratio between the total amount by which the building can be expanded compared to the total cost of expanding the building by the amount. One benefit of generating normalized values is that these values can be compared across different building designs, even if different approaches are selected for identifying remaining spaces and/or usable spaces for the different building designs.

Evaluation module 226 receives the metrics 250, including the aggregate expansion values for the budding design, and analyzes the metrics 250 to generate evaluation results 228. In some embodiments, the evaluation results 228 indicate, based on the metrics 250, how well or whether a budding design satisfies one or more design goals. The design goals may include pre-defined goals and/or goals specified in design data 218, such as requirements of the building design.

In some embodiments, design engine 118 generate an interactive graphical user interface (GUI) that depicts the various analyses performed and the evaluation results 228 generated by the various analyses, and displays the GUI to the end user. Additionally, the GUI may depict one or more of a visualization of the building geometry 230, a visualization of the building layout 240, or the metrics 250.

In some embodiments, design engine 118 generates a plurality of building designs and the GUI depicts evaluation results, metrics, and visualizations corresponding to each building design of the plurality of building designs. This allows an end user to quickly view and compare metrics and evaluation results across several potential building designs generated by the design engine 118. Additionally, the GUI may include tools for searching, filtering, and/or sorting the plurality of building designs. For example, a user may interact with the GUI to identify building designs that satisfy a particular design criteria.

In some embodiments, the evaluation results 228 are provided back to geometry generation module 220 and/or layout generation module 222 for iterating on or optimizing building geometry 230 and/or building layout 240. Based on the evaluation results 228, geometry generation module 220 and/or layout generation module 222 repeat the geometry generation and/or layout generation procedure with input parameters varied according to the evaluation results. In one or more embodiments, geometry generation module 220 determines one or more alternate or optimized placements for the building based on the one or more aggregate expansion values. For example, geometry generation module 220 may adjust the location of the building within the site and/or the orientation of the building within the site based on the aggregate expansion values.

In this manner, geometry generation module 220 and layout generation module 222 may perform any number of different iterations until a collection of building designs are generated that meet the one or more design goals, that meet a threshold number of the one or more design goals, or meet the each of the one or more design goals to a threshold degree. After the collection of building designs are generated, design engine 118 may generate a GUI that depicts evaluation results, metrics, and/or visualizations corresponding to each building design of the collection of building designs, and display the GUI to the user.

Figure 6:
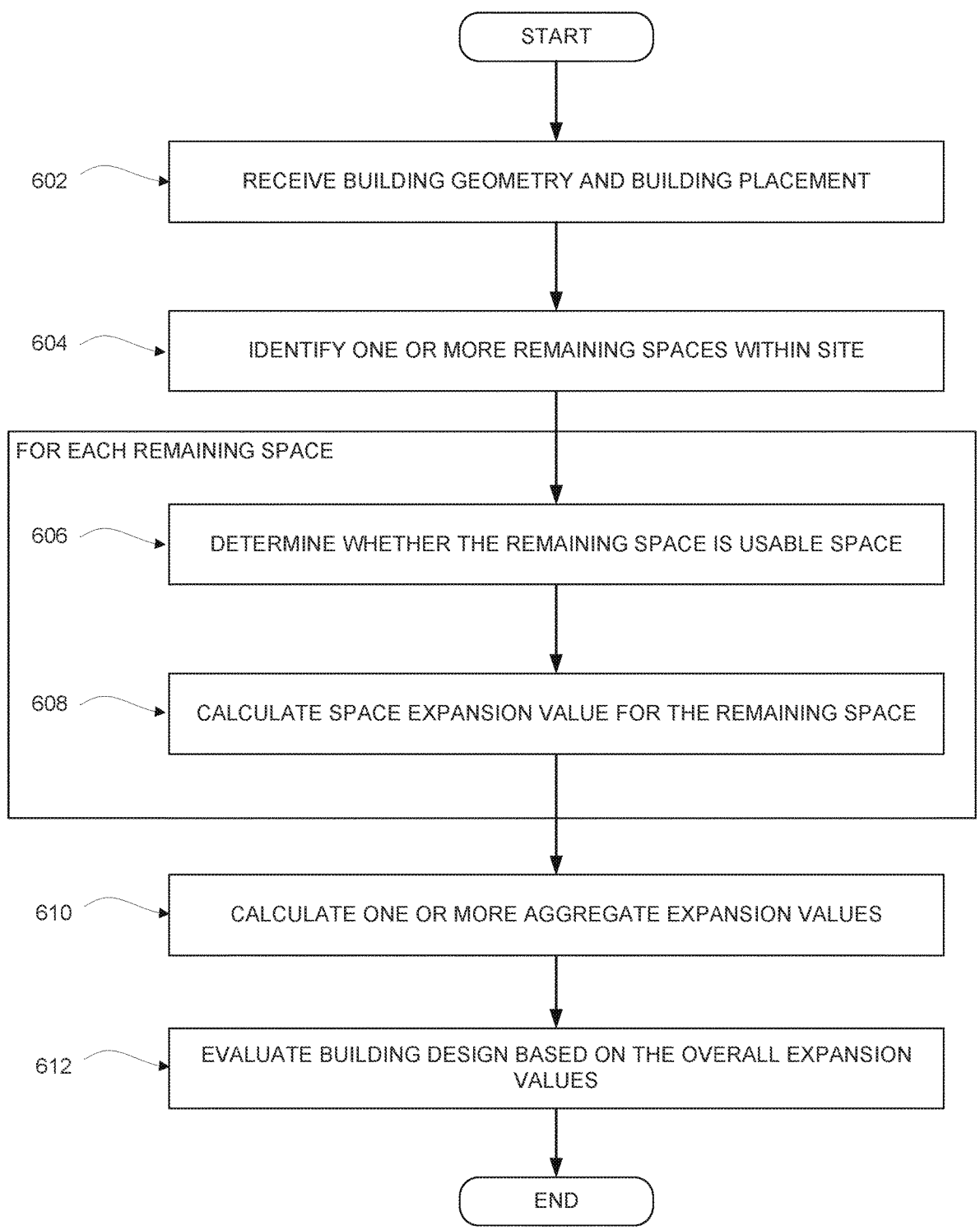
FIG. 6 is a flowchart of method steps for expansion calculation performed by the design engine of FIG. 1, according to various embodiments of the present disclosure.

FIG. 6 is a flowchart of method steps for work condition calculation performed by the design engine 118 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 602, expansion value generator 260 receives a building geometry 230 from geometry generation module 220. Building geometry 230 indicates a size and shape of the building. In some embodiments, the building geometry 230 also indicates a placement of the building within the site, including a location and an orientation of the building on the site. In other embodiments, expansion value generator 260 receives data indicating the placement of the building from data store 120.

In some embodiments, expansion value generator 260 also receives a building layout 240 from layout generation module 222 and/or from data store 120. Building layout 240 indicates the locations within the building of a plurality of workspaces or workstations of the building. In some embodiments, expansion value generator 260 also receives operation data 210 from data store 120. Operation data 210 includes data describing a plurality of operations of the building. In some embodiments, expansion value generator 260 also receives workspace data 212 from data store 120. Workspace data 212 includes data describing the plurality of workspaces or workstations. In some embodiments, expansion value generator 260 also receives site data 216. Site data 216 includes data describing the site that the building is to be constructed on. In some embodiments, expansion value generator 260 also receives design data 218 from data store 120. Design data 218 includes data describing one or more aspects of the building design by which expansion may be evaluated.

In step 604, expansion value generator 260 identifies one or more remaining spaces within the site based on the building geometry 230 and building placement. Identifying the one or more remaining spaces is performed in a manner similar to that disclosed above with respect to expansion value generator 260. In some embodiments, identifying the one or more remaining spaces based on placement of the building on the site includes generating a layout that indicates the location within the site of the building. In some embodiments, identifying the one or more remaining spaces includes identifying one or more contiguous portions of the site within the non-occupied site area. Each remaining space of the one or more remaining spaces corresponds to a different contiguous portion of the site. In some embodiments, identifying the one or more remaining spaces includes expanding the building along one or more axis of the building into the non-occupied site area. Each remaining space of the one or more remaining spaces corresponds to a different expanded portion of the building.

In some embodiments, identifying the one or more remaining spaces includes dividing the non-occupied site area into a plurality of portions. Each remaining space of the one or more remaining spaces corresponds to a different portion of the plurality of portions. In some embodiments, expansion value generator 260 divides the non-occupied site area into a plurality of portions based on the edges of a building footprint of the building. Expansion value generator 260 selects one or more edges of the building footprint and extends each selected edge towards a boundary of the site. The extended edges form dividing lines along which the non-occupied site area may be divided. In some embodiments, expansion value generator 260 divides the non-occupied site area into a plurality of portions based on the sides of the building, Expansion value generator 260 divides the non-occupied site area into a plurality of portions where each portion corresponds to a different side of the building.

In one or more embodiments, expansion value generator 260 identifies multiple sets of remaining spaces, where each set of remaining spaces is identified using a different approach discussed above. For example, a first set of remaining spaces may be identified by identifying one or more contiguous portions of the site within the non-occupied site area, and a second set of remaining spaces may be identified by expanding the building along one or more axis of the building into the non-occupied site area.

In step 606, expansion value generator 260 determines, for each remaining space of the one or more remaining spaces, whether the remaining space is a usable space. Determining whether a remaining space is a usable space is performed in a manner similar to that disclosed above with respect to expansion value generator 260. In one or more embodiments, determining whether a remaining space is a usable space is based on one or more of: a size of the remaining space, one or more workspaces or workstations of the building, one or more operations of the building, or design data associated with the building.

In step 608, expansion value generator 260 calculates a respective one or more space expansion values for each remaining space of the one or more remaining spaces. Calculating the respective one or more space expansion values for a remaining space is performed in a manner similar to that disclosed above with respect to expansion value generator 260. Each space expansion value corresponds to a different metric or measurement associated with the remaining space, such as whether the remaining space is a usable space; whether the remaining space can fit a particular workspace, workstation, or operation; whether the remaining space can fit a particular number of workspaces, workstations, or operations; a number of different workspaces, workstations, or operations that can fit in the remaining space; a size of the remaining space; whether the size of the remaining space exceeds a threshold amount; and so forth.

In some embodiments, expansion value generator 260 generates a plurality of space expansion values for each remaining space, where each space expansion value corresponds to a different approach for determining whether the remaining space is a usable space.

In step 610, expansion value generator 260 calculates one or more expansion values for the building and building placement. Calculating the one or more expansion values is performed in a manner similar to that disclosed above with respect to expansion value generator 260. In some embodiments, expansion value generator 260 calculates one or more aggregate expansion values based on the space expansion values for the one or more remaining spaces. Calculating the aggregate expansion values may include, for example, adding, averaging, or otherwise aggregating the space expansion values for the one or more remaining spaces.

In some embodiments, expansion value generator 260 generates a plurality of space expansion values for each remaining space, where each space expansion value corresponds to a different approach for determining whether the remaining space is a usable space. Expansion value generator 260 calculates, for each approach, an aggregate expansion value corresponding to the approach.

In some embodiments, expansion value generator 260 identifies multiple sets of remaining spaces, where each set of remaining spaces is identified using a different approach discussed above with respect to expansion value generator 260. Expansion value generator 260 calculates, for each set of remaining spaces, one or more respective aggregate expansion values corresponding to the approach. The metrics or measurements associated with the respective aggregate expansion values may differ based on the approach.

In some embodiments, expansion value generator 260 calculates the one or more aggregate expansion values based on the non-occupied site area(s). For example, expansion value generator 260 may calculate an aggregate expansion value that indicates a ratio between the area of the non-occupied site area(s) and the perimeter of the non-occupied site area(s). As another example, expansion value generator 260 may calculate an aggregate expansion value that indicates a ratio between the total amount of usable remaining space compared to the total amount of unusable remaining space.

In step 612, design engine 118 evaluates the building design based on the one or more aggregate expansion values. Evaluating the building design based on the one or more expansion values is performed in a manner similar to that disclosed above with respect to design engine 118. In one or more embodiments, evaluating the building design based on the one or more aggregate expansion values includes analyzing the aggregate expansion values to generate evaluation results 228 that indicate how well or whether the building design satisfies expansion design goals. In one or more embodiments, evaluating the building design based on the one or more expansion values includes generating a GUI that depicts the one or more aggregate expansion values and displays the GUI to an end user. In one or more embodiments, evaluating the building design based on the one or more aggregate expansion values includes adjusting or optimizing the building geometry and/or building placement based on the one or more aggregate expansion values.

In sum, the computer system generates one or more expansion values that indicate the ability of a site layout to accommodate future expansion of a building on the site. The computer system receives input data describing a site layout and one or more buildings on the site. The input data may include, for example, data describing the site shape and boundary, the shape and boundary of areas outside of the site boundary, the sizes and shapes of the one or more buildings, the locations of the one or more buildings within the site, and the orientation of the one or more buildings within the site.

The computer system determines, based on the site layout and the one or more buildings, one or more spaces remaining on the site after the one or more buildings are placed on the site based on the site layout. The computer system determines, based on the one or more buildings and the size and shape of the space, whether the one or more remaining spaces are usable for future expansion.

In one approach, determining whether the one or more remaining spaces are usable for future expansion includes determining whether a particular budding of the one or more buildings can be extended or expanded along one or more axis, such as each direction that exterior walls of the buildings face. The computer system determines, for each axis, an amount by which the building can be extended or expanded along the axis into a space of the one or more remaining spaces. The computer system determines whether the space is a usable space based on the amount by which the building can be extended or expanded into the space.

In some approaches, the computer system receives input data describing estimated future expansion of the one or more buildings. For example, the input data may include data describing a type of operation, a size of a future building expansion, a shape of a future building expansion, and/or a total area needed for expansion. Determining whether the one or more spaces are usable for future expansion includes determining whether the one or more spaces can accommodate the estimated future expansion.

The computer system generates the one or more expansion values based on one or more of: a number of usable spaces compared to unusable spaces, a size of usable spaces compared to a size of unusable spaces, an area of usable spaces compared to a perimeter of usable spaces, an amount that a building can be extended into a usable space, a cost of extending a building into a usable space, a size of usable spaces compared to a size of a future building expansion, or an area of usable spaces compared to a total area of expansion.

At least one advantage of the disclosed techniques is that the computer system evaluates whether a building layout and site design provides room for expansion of the building layout, without requiring data specifying any particular size or type of expansion of the building layout. Additionally, this approach provides metrics that enable optimization of the building layout and site design prior to the building layout and site design being constructed. When used as part of a design application that iteratively generates improved layouts that meet specific design objectives, this approach may be used to identify layouts that both meet the design objectives and most effectively provide room for future 1. In various embodiments, a computer-implemented method for computationally determining expandability of a building design comprises receiving a building geometry indicating a size of a building and a shape of the building and building placement data indicating a placement of the building within a site, identifying one or more remaining spaces within the site based at least on the size of the building, the shape of the building, and the placement of the building within the site, for each remaining space of the one or more remaining spaces, determining whether the remaining space comprises a usable space, based on the determining whether the remaining space is a usable space, generating a space expansion value corresponding to the remaining space, computing, based on space expansion values corresponding to the one or more remaining spaces, one or more aggregate expansion values associated with the building geometry and the building placement, and performing one or more building design operations based on the one or more aggregate expansion values.
2. The method of clause 1, where identifying the one or more remaining spaces includes identifying one or more contiguous portions of the site that are not occupied by the building.
3. The method of clause 1 or 2, where identifying the one or more remaining spaces includes expanding the building along one or more axis of the building into areas of the site that are not occupied by the building.
4. The method of any of clauses 1-3, where identifying the one or more remaining spaces includes dividing an area of the site that is not occupied by the building into a plurality of portions.
5. The method of any of clauses 1-4, where determining whether the remaining space comprises a usable space is based on a size of the remaining space.
6. The method of any of clauses 1-5, where determining whether the remaining space comprises a usable space is based on one or more workspaces associated with the building.
7. The method of any of clauses 1-6, where determining whether the remaining space comprises a usable space is based on one or more workstations associated with the building.
8. The method of any of clauses 1-7, where determining whether the remaining space comprises a usable space is based on one or more operations associated with the building.
9. The method of any of clauses 1-8, where a first building design operation included in the one or more building design operations comprises adjusting the placement of the building within the site based at least on the one or more aggregate expansion values to generate one or more alternate building designs.
10. The method of any of clauses 1-9, further comprising evaluating the building design based at least on the one or more aggregate expansion values.
11. In various embodiments, one or more non-transitory computer readable storage media store instructions that, when executed by one or more processors, cause the one or more processors to perform the steps of receiving a building geometry indicating a size of a building and a shape of the building and building placement data indicating a placement of the building within a site, identifying one or more remaining spaces within the site based at least on the size of the building, the shape of the building, and the placement of the building within the site, for each remaining space of the one or more remaining spaces, determining whether the remaining space comprises a usable space, based on the determining whether the remaining space is a usable space, generating a space expansion value corresponding to the remaining space, computing, based on space expansion values corresponding to the one or more remaining spaces, one or more aggregate expansion values associated with the building geometry and the budding placement, and performing one or more building design operations based on the one or more aggregate expansion values.
12. The one or more non-transitory computer readable storage media of clause 11, where identifying the one or more remaining spaces includes identifying one or more contiguous portions of the site that are not occupied by the building.
13. The one or more non-transitory computer readable storage media of clause 11 or 12, where identifying the one or more remaining spaces includes expanding the building along one or more axis of the building into areas of the site that are not occupied by the building.
14. The one or more non-transitory computer readable storage media of any of clauses 11-13, where identifying the one or more remaining spaces includes dividing an area of the site that is not occupied by the building into a plurality of portions.
15. The one or more non-transitory computer readable storage media of any of clauses 11-14, where determining whether the remaining space comprises a usable space is based on a size of the remaining space.
16. The one or more non-transitory computer readable storage media of any of clauses 11-15, where determining whether the remaining space comprises a usable space is based on one or more workspaces associated with the building.
17. The one or more non-transitory computer readable storage media of any of clauses 11-16, where determining whether the remaining space comprises a usable space is based on one or more workstations associated with the building.
18. The one or more non-transitory computer readable storage media of any of clauses 11-17, where determining whether the remaining space comprises a usable space is based on one or more operations associated with the building.
19. The one or more non-transitory computer readable storage media of any of clauses 11-18, where a first building design operation included in the one or more building design operations comprises adjusting the placement of the building within the site based at least on the one or more aggregate expansion values to generate one or more alternate building designs.
20. In various embodiments, a computer system comprises a memory, and a processor that receives a building geometry indicating a size of a building and a shape of the building and building placement data indicating a placement of the building within a site, identifies one or more remaining spaces within the site based at least on the size of the building, the shape of the building, and the placement of the building within the site, for each remaining space of the one or more remaining spaces, determines whether the remaining space comprises a usable space, based on the determining whether the remaining space is a usable space, generates a space expansion value corresponding to the remaining space, computes, based on space expansion values corresponding to the one or more remaining spaces, one or more aggregate expansion values associated with the building geometry and the building placement, and performs one or more building design operations based on the one or more aggregate expansion values.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computationally determining expandability of a building design, the method comprising:
receiving a first computer-aided design (CAD) model comprising building geometry indicating a size of a building and a shape of the building, building placement data indicating a placement of the building within a site, and design data specifying a predicted building expansion size;
performing one or more processing operations on the first CAD model, via a CAD engine, to identify one or more remaining spaces within the site based at least on the size of the building, the shape of the building, and the placement of the building within the site;
for each remaining space of the one or more remaining spaces:
determining whether the remaining space comprises a usable space;
based on the determining whether the remaining space is a usable space, generating a space expansion value corresponding to the remaining space based on a ratio between a size of the remaining space and the predicted building expansion size;
computing, based on space expansion values corresponding to the one or more remaining spaces, one or more aggregate expansion values associated with the building geometry and the building placement; and
performing one or more building design operations based on the one or more aggregate expansion values.

2. The method of claim 1, wherein identifying the one or more remaining spaces includes identifying one or more contiguous portions of the site that are not occupied by the building.

3. The method of claim 1, wherein identifying the one or more remaining spaces includes expanding the building along one or more axis of the building into areas of the site that are not occupied by the building.

4. The method of claim 1, wherein identifying the one or more remaining spaces includes dividing an area of the site that is not occupied by the building into a plurality of portions.

5. The method of claim 1, wherein determining whether the remaining space comprises a usable space is based on a size of the remaining space.

6. The method of claim 1, wherein determining whether the remaining space comprises a usable space is based on one or more workspaces associated with the building.

7. The method of claim 1, wherein determining whether the remaining space comprises a usable space is based on one or more workstations associated with the building.

8. The method of claim 1, wherein determining whether the remaining space comprises a usable space is based on one or more operations associated with the building.

9. The method of claim 1, wherein a first building design operation included in the one or more building design operations comprises adjusting the placement of the building within the site based at least on the one or more aggregate expansion values to generate one or more alternate building designs.

10. The method of claim 1, further comprising evaluating the building design based at least on the one or more aggregate expansion values.

11. One or more non-transitory computer readable storage media storing instructions that, when executed by one or more processors, cause the one or more processors to perform the steps of:
receiving a first computer-aided design (CAD) model comprising building geometry indicating a size of a building and a shape of the building, building placement data indicating a placement of the building within a site, and design data specifying a predicted building expansion size;
performing one or more processing operations on the first CAD model, via a CAD engine, to identify one or more remaining spaces within the site based at least on the size of the building, the shape of the building, and the placement of the building within the site;
for each remaining space of the one or more remaining spaces:
determining whether the remaining space comprises a usable space;
based on the determining whether the remaining space is a usable space, generating a space expansion value corresponding to the remaining space based on a ratio between a size of the remaining space and the predicted building expansion size;
computing, based on space expansion values corresponding to the one or more remaining spaces, one or more aggregate expansion values associated with the building geometry and the building placement; and
performing one or more building design operations based on the one or more aggregate expansion values to generate a second CAD model.

12. The one or more non-transitory computer readable storage media of claim 11, wherein identifying the one or more remaining spaces includes identifying one or more contiguous portions of the site that are not occupied by the building.

13. The one or more non-transitory computer readable storage media of claim 11, wherein identifying the one or more remaining spaces includes expanding the building along one or more axis of the building into areas of the site that are not occupied by the building.

14. The one or more non-transitory computer readable storage media of claim 11, wherein identifying the one or more remaining spaces includes dividing an area of the site that is not occupied by the building into a plurality of portions.

15. The one or more non-transitory computer readable storage media of claim 11, wherein determining whether the remaining space comprises a usable space is based on a size of the remaining space.

16. The one or more non-transitory computer readable storage media of claim 11, wherein determining whether the remaining space comprises a usable space is based on one or more workspaces associated with the building.

17. The one or more non-transitory computer readable storage media of claim 11, wherein determining whether the remaining space comprises a usable space is based on one or more workstations associated with the building.

18. The one or more non-transitory computer readable storage media of claim 11, wherein determining whether the remaining space comprises a usable space is based on one or more operations associated with the building.

19. The one or more non-transitory computer readable storage media of claim 11, wherein a first building design operation included in the one or more building design operations comprises adjusting the placement of the building within the site based at least on the one or more aggregate expansion values to generate one or more alternate building designs.

20. A computer system, comprising:
a memory; and
a processor that:
receives a first computer-aided design (CAD) model comprising building geometry indicating a size of a building and a shape of the building, building placement data indicating a placement of the building within a site, and design data specifying a predicted building expansion size,
perform one or more processing operations on the first CAD model, via a CAD engine, to identify one or more remaining spaces within the site based at least on the size of the building, the shape of the building, and the placement of the building within the site,
for each remaining space of the one or more remaining spaces:
determines whether the remaining space comprises a usable space,
based on the determining whether the remaining space is a usable space, generates a space expansion value corresponding to the remaining space based on a ratio between a size of the remaining space and the predicted building expansion size,
computes, based on space expansion values corresponding to the one or more remaining spaces, one or more aggregate expansion values associated with the building geometry and the building placement, and
performs one or more building design operations based on the one or more aggregate expansion values.

* * * * *

UNITED STATES PATENT AND TRADEMARK OFFICE
CERTIFICATE OF CORRECTION

PATENT NO. : 11,823,110 B2
APPLICATION NO. : 17/098287
DATED : November 21, 2023
INVENTOR(S) : David Benjamin et al.

It is certified that error appears in the above-identified patent and that said Letters Patent is hereby corrected as shown below:

On the Title Page

(56) References Cited:
Please delete "3,005,656 A1 8/2011 Ankory et al." and insert --8,005,656 B1 8/2011 Ankory et al.--.

Signed and Sealed this
Twenty-third Day of January, 2024

Katherine Kelly Vidal
*Director of the United States Patent and Trademark Office*